United States Patent
Nakamoto et al.

(10) Patent No.: US 8,924,136 B2
(45) Date of Patent: Dec. 30, 2014

(54) DEVICE AND METHOD FOR CONTROLLING START OF COMPRESSION SELF-IGNITION ENGINE

(75) Inventors: Yoshihisa Nakamoto, Hiroshima (JP); Takeo Yamauchi, Aki-gun (JP); Junichi Taga, Higashihiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 341 days.

(21) Appl. No.: 13/594,697

(22) Filed: Aug. 24, 2012

(65) Prior Publication Data
US 2013/0080039 A1 Mar. 28, 2013

(30) Foreign Application Priority Data
Sep. 26, 2011 (JP) .................................. 2011-209447

(51) Int. Cl.
| | |
|---|---|
| *F02N 11/08* | (2006.01) |
| *F02B 3/10* | (2006.01) |
| *F02D 41/06* | (2006.01) |
| *F02D 41/40* | (2006.01) |
| *F02D 41/00* | (2006.01) |
| *F02N 19/00* | (2010.01) |
| *F02N 99/00* | (2010.01) |

(52) U.S. Cl.
CPC ...... *F02D 41/009* (2013.01); *F02D 2041/0095* (2013.01); *F02N 2019/008* (2013.01); *F02N 11/0814* (2013.01); *Y02T 10/44* (2013.01); *F02D 41/403* (2013.01); *F02D 2200/021* (2013.01); *F02N 99/006* (2013.01); *F02D 41/065* (2013.01)
USPC ........ 701/112; 701/113; 123/179.4; 123/299; 123/491

(58) Field of Classification Search
CPC . F02D 41/065; F02D 41/402; F02N 11/0914; F02N 2019/008
USPC ................... 123/436, 481, 491, 179.3, 179.4, 123/179.16, 299, 300, 305; 701/112, 113, 701/103
See application file for complete search history.

(56) References Cited

U.S. PATENT DOCUMENTS

| | | | |
|---|---|---|---|
| 2013/0074809 A1* | 3/2013 | Nakamoto et al. ............ | 123/478 |
| 2013/0080036 A1* | 3/2013 | Yamauchi et al. ............ | 701/112 |
| 2013/0138328 A1* | 5/2013 | Shimo et al. .................. | 701/104 |

FOREIGN PATENT DOCUMENTS

JP 2009062960 3/2009

* cited by examiner

*Primary Examiner* — Hai Huynh
(74) *Attorney, Agent, or Firm* — Alleman Hall McCoy Russell & Tuttle LLP

(57) ABSTRACT

A start control device includes a compression self-ignition engine, fuel injectors, a piston stop position detector, a starter motor and a controller for automatically stopping the engine when a predetermined automatic stop condition is satisfied, and thereafter, when a predetermined restart condition is satisfied and a compression-stroke-in-stop cylinder piston stop position is within a reference stop position range set relatively on a bottom dead center side, restarting the engine by injecting the fuel into the compression-stroke-in-stop cylinder while applying the rotational force to the engine using the starter motor. In restarting the engine, when the fuel is injected in the compression-stroke-in-stop cylinder, the controller controls the fuel injector to perform a pre-injection before a main injection and increase a total injection amount of the fuel for the pre-injection as the stop position of the compression-stroke-in-stop cylinder piston is further on a top dead center side.

8 Claims, 6 Drawing Sheets

DEVICE AND METHOD FOR CONTROLLING START OF COMPRESSION SELF-IGNITION ENGINE

BACKGROUND

The present invention relates to a start control device including a compression self-ignition engine for combusting a fuel injected into a cylinder by a self-ignition. The start control device automatically stops the engine when a predetermined automatic stop condition is satisfied, and when a predetermined restart condition is satisfied, restarts the engine by injecting the fuel into a compression-stroke-in-stop cylinder that is on a compression stroke while the engine is stopped, while applying a torque to the engine by using a starter motor.

In recent years, compression self-ignition engines represented by a diesel engine have been widely familiarized as in-vehicle engines for reasons of their generally excellent thermal efficiency and less discharge amount of $CO_2$ compared to spark-ignition engines, such as gasoline engines.

For larger reduction of $CO_2$ in such compression self-ignition engines, it is effective to adopt the art of a so called idle stop control of automatically stopping the engine under, for example, an idle drive, and then automatically restarting the engine when, for example, a starting operation of the vehicle is performed, and various studies relating to this have been performed.

For example, JP2009-062960A (paragraph [0048]) discloses a control device of a diesel engine for automatically stopping the diesel engine when a predetermined automatic stop condition is satisfied, and when a predetermined restart condition is satisfied, restarting the diesel engine by injecting a fuel while applying a torque to the engine by driving a starter motor. Further, it is disclosed that a cylinder into which the fuel is injected first is changeably set based on a stop position of a piston of a cylinder that is on a compression stroke while an engine is stopped, in other words, when the engine stop is completed (compression-stroke-in-stop cylinder).

Further specifically, when the diesel engine is automatically stopped, a position of the piston of the compression-stroke-in-stop cylinder that is on the compression stroke at that time is determined, and it is determined whether the piston position is within a predetermined reference stop position range set relatively on a bottom dead center (BDC) side. When the piston position is within the reference stop position range, in restarting the engine, the fuel is injected into the compression-stroke-in-stop cylinder first, and on the other hand, when the piston position is on a top dead center (TDC) side of the reference stop position range, when the engine overall passes the TDC for the first time in the restart and an intake-stroke-in-stop cylinder (cylinder on intake stroke while the engine is stopped) reaches the compression stroke, the fuel is injected into the intake-stroke-in-stop cylinder.

According to such a configuration, when the piston of the compression-stroke-in-stop cylinder is within the reference stop position range, by injecting the fuel into the compression-stroke-in-stop cylinder, the fuel can surely self-ignite and the engine can promptly be restarted in a comparatively short time period (referred to as "the first compression start" for convenience). On the other hand, when the piston of the compression-stroke-in-stop cylinder is located on the TDC side of the reference stop position range, because a compression stroke amount (compression margin) is less and a temperature of air inside the cylinder does not rise sufficiently, a misfire may occur even when the fuel is not injected into the compression-stroke-in-stop cylinder. Therefore, in such a case, the fuel is injected into the intake-stroke-in-stop cylinder and not the compression-stroke-in-stop cylinder, and thereby, the air inside the cylinder is sufficiently compressed and the fuel can surely self-ignite (referred to as "the second compression start" for convenience).

As described above, conventionally, when restarting the engine, it is determined whether the piston of the compression-stroke-in-stop cylinder is stopped within the reference stop position range, and when the piston is stopped therein, the fuel is injected into the compression-stroke-in-stop cylinder and the engine is promptly restarted by the first compression start. Here, to better ensure a prompt engine restart by increasing the potential of the first compression start, it is desirable to enlarge the reference stop position range toward the TDC as much as possible. However, when the piston is stopped relatively on the TDC side, because a compression stroke amount becomes less than when the piston is stopped relatively on the BDC side, a temperature inside the cylinder when being compressed to the TDC (referred to as "the TDC temperature" for convenience) accordingly becomes insufficient and the fuel may not ignite. Therefore, in the conventional first compression start, a problem arises in that there is no choice but to limit the reference stop position range to a range close to the BDC, which is problematic because the reference stop position range is relatively narrow.

SUMMARY

The present invention is made in view of the above situations, and aims to stably and surely restart a compression self-ignition engine by the first compression start, even when a stop position of a piston of a compression-stroke-in-stop cylinder is relatively on a TDC side when restarting the compression self-ignition engine, in other words, even when an unfavorable condition for increasing the temperature inside the cylinder during the compression (i.e., an unfavorable condition for igniting the fuel injected into the compression-stroke-in-stop cylinder) exists.

According to one aspect of the invention, a start control device is provided. The device includes: a compression self-ignition engine; fuel injectors for injecting fuel into cylinders of the engine, respectively; a piston stop position detector for detecting stop positions of pistons in the cylinders; a starter motor for applying a rotational force to the engine, the engine combusting through a self-ignition, the fuel injected into the cylinders by the fuel injectors; and a controller for automatically stopping the engine when a predetermined automatic stop condition is satisfied, and thereafter, when a predetermined restart condition is satisfied and the stop position of the piston of a compression-stroke-in-stop cylinder that is on a compression stroke while the engine is stopped is within a reference stop position range set relatively on a bottom dead center side, restarting the engine by injecting the fuel into the compression-stroke-in-stop cylinder while applying the rotational force to the engine by using the starter motor. In restarting the engine, when the fuel is injected in the compression-stroke-in-stop cylinder, the controller controls the fuel injector to perform a pre-injection for a pre-combustion before a main injection for a main combustion and increase a total injection amount of the fuel for the pre-injection as the stop position of the piston of the compression-stroke-in-stop cylinder is further on a top dead center side.

According to this aspect of the invention, in restarting the engine, when the fuel is injected into the compression-stroke-in-stop cylinder (i.e., when the first compression start is performed), the pre-combustion is performed before the main combustion which is a diffusion combustion. Therefore, the temperature inside the compression-stroke-in-stop cylinder is increased by the pre-combustion, the top dead center temperature is increased, and an ignitability of the fuel injected in the main injection after the pre-injection is improved. Therefore, even if the stop position of the piston of the compression-stroke-in-stop cylinder is on the top dead center side, in other words, even if an unfavorable condition for igniting the fuel injected into the compression-stroke-in-stop cylinder exists, by overcoming the disadvantage caused thereby by performing a pre-injection, the compression self-ignition engine can stably, promptly, and surely be restarted by the first compression start. Thus, the reference stop position range can be enlarged toward the top dead center, the potential for performing the first compression start can be increased, and a prompt starting performance can be secured.

Moreover, because the total injection amount of the fuel for the pre-injection increases as the stop position of the piston of the compression-stroke-in-stop cylinder is further on the top dead center side, heat production during the pre-combustion increases, and the temperature inside the compression-stroke-in-stop cylinder further increases. As a result, even if the conditions for igniting the fuel injected into the compression-stroke-in-stop cylinder (i.e., the stop position of the piston of the compression-stroke-in-stop cylinder is relatively on the top dead center side) are relatively unfavorable, performing a pre-combustion increases the temperature inside the compression-stroke-in-stop cylinder, thereby increasing the top dead center temperature, improving the ignitability of the fuel injected in the main injection after the pre-injection, and ensuring that the first compression start is reliably performed.

The controller may control the fuel injector to pre-inject the fuel for the pre-injection in a single or divided multiple-stage fashion, and increase the total injection amount of the fuel for the pre-injection by increasing the number of the pre-injections.

According to this configuration, by increasing the number of divided pre-injections while, for example, fixing the fuel injection amount per single pre-injection, the total injection amount of the fuel for the pre-injection can easily and surely be increased.

The controller may control the fuel injector to increase the total injection amount of the fuel for the pre-injection as a temperature of a coolant of the engine decreases.

According to this configuration, because the total injection amount of the fuel for the pre-injection increases as engine coolant temperature (i.e., engine temperature) becomes lower, the heat production during the pre-combustion increases, and the temperature inside the compression-stroke-in-stop cylinder further increases. As a result, even if the conditions for igniting the fuel injected into the compression-stroke-in-stop cylinder (i.e., the engine coolant temperature is relatively low) are more unfavorable, performing the pre-combustion increases the temperature inside the compression-stroke-in-stop cylinder, thereby increasing the top dead center temperature, improving the ignitability of the fuel injected in the main injection after the pre-injection, and ensuring the first compression start is reliably performed.

Note that, the unfavorable conditions for igniting the fuel also include the external air temperature (i.e., the temperature of the fresh air introduced into the cylinder, or intake air temperature) being relatively low, and the atmospheric pressure (i.e., the pressure of the fresh air introduced into the cylinder, or intake air pressure) being relatively low. For example, it is preferable for the controller to control the fuel injector to increase the total injection amount of the fuel for the pre-injection as the intake temperature during the engine automatic control becomes lower or the intake pressure during the engine automatic control becomes lower.

The controller may control the fuel injector to increase a total injection amount of the fuel for the main injection as the stop position of the piston of the compression-stroke-in-stop cylinder is further on the bottom dead center side.

According to this configuration, because the injection amount of the fuel for the main injection is increased as the stop position of the piston of the compression-stroke-in-stop cylinder is further on the bottom dead center side, the fuel in the amount corresponding to a filling amount (i.e., air amount) in the first compression of the compression-stroke-in-stop cylinder is injected in the main injection. Therefore, a torque for starting the engine is generated sufficiently and the engine is started smoothly.

Further, for example, the total fuel injection amount of the pre-injection and the main injection may be determined according to the stop position of the piston of the compression-stroke-in-stop cylinder (i.e., corresponding to the filling amount in the first compression of the compression-stroke-in-stop cylinder). In such a case, in the total fuel injection amount of the pre-injection and the main injection, the fuel injection amount for the pre-injection is increased and the fuel injection amount for the main injection is reduced as the stop position of the piston of the compression-stroke-in-stop cylinder is further on the top dead center side. As a result, an injection pattern prioritizing the ignitability is created. On the other hand, in the total fuel injection amount of the pre-injection and the main injection, the fuel injection amount for the main injection is increased and the fuel injection amount for the pre-injection is reduced as the stop position of the piston of the compression-stroke-in-stop cylinder is further on the bottom dead center side. As a result, an injection pattern prioritizing the torque is created.

DETAILED DESCRIPTION OF THE EMBODIMENTS (1) Overall Configuration of Engine

Figure 1:
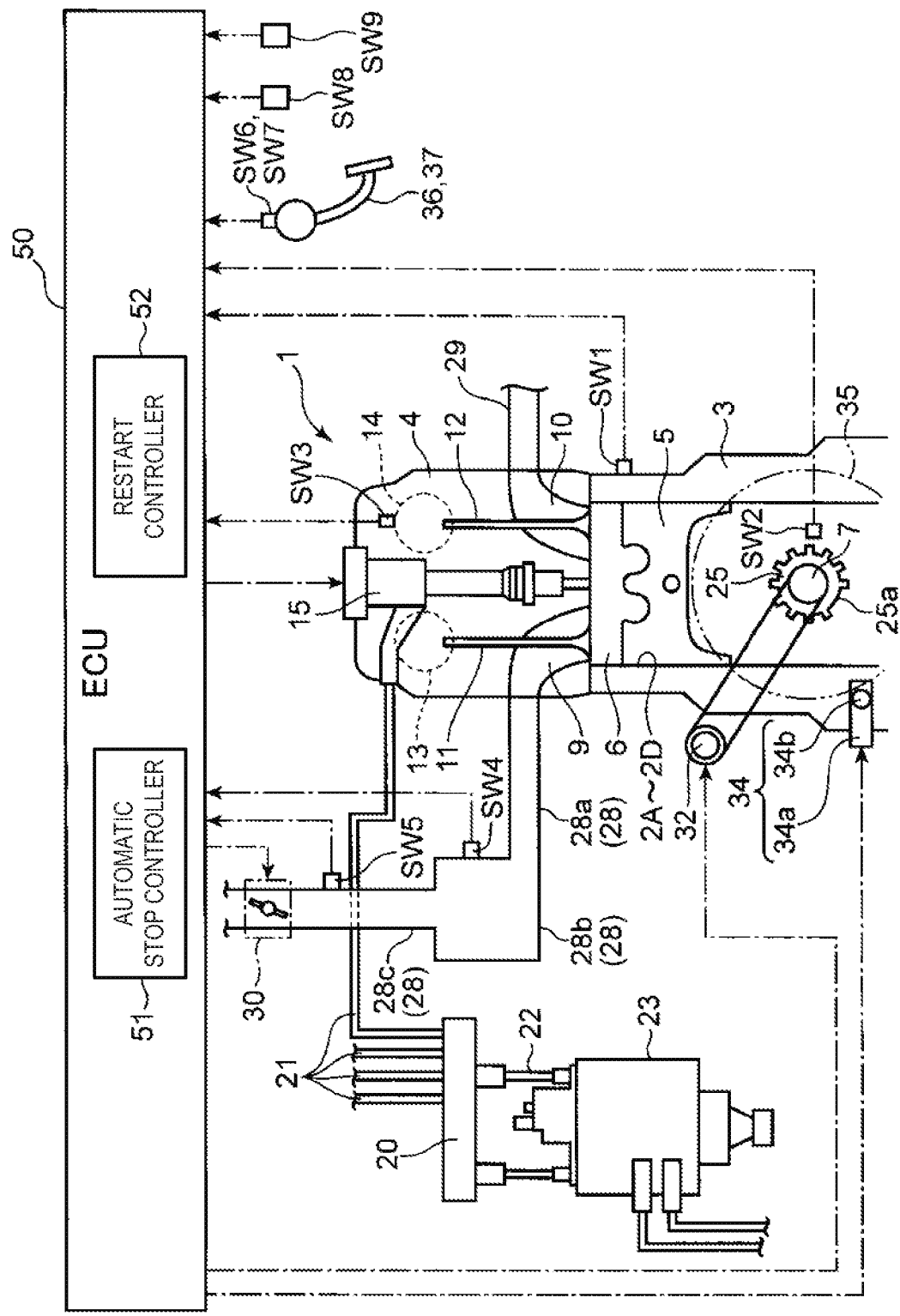
FIG. 1 is a systematic configuration diagram showing an overall configuration of a diesel engine applied with a start control device according to an embodiment of the invention.

FIG. 1 is a systematic configuration diagram showing an overall configuration of a diesel engine applied with a start control device according to an embodiment of the invention. The diesel engine shown in FIG. 1 is a four cycle diesel engine mounted in a vehicle as a power source for driving the vehicle. An engine body 1 of the engine is an inline four cylinder type and includes a cylinder block 3 having four cylinders 2A to 2D aligning in a direction where the cylinders overlap with each other in FIG. 1, a cylinder head 4 disposed on the top of the cylinder block 3, and pistons 5 reciprocatably fitted into the cylinders 2A to 2D, respectively.

A combustion chamber 6 is formed above each piston 5, and each combustion chamber 6 is supplied with fuel (e.g., diesel fuel) injected from a fuel injection valve 15, described later. Further, the injected fuel self-ignites in the combustion chamber 6 where temperature and pressure are high because of a compression operation by the piston 5 (i.e., a self-igniting compression), and the piston 5 is pushed down by an expansive force due to the combustion caused by the ignition and reciprocatably moves in a vertical direction.

Each piston 5 is coupled to a crankshaft 7 via a connecting rod (arranged outside the range of FIG. 1), and the crankshaft 7 rotates about its central axis according to the reciprocation movement (i.e., vertical movement) of the pistons 5.

Here, in the four-cycle four-cylinder diesel engine, the pistons 5 provided in the cylinders 2A to 2D vertically move with a phase difference of 180° in crank angle (180° CA). Therefore, combustion timings (i.e., fuel injection) in the cylinders 2A to 2D are set to vary in phase by 180° CA from each other. Specifically, when the cylinders 2A to 2D are numbered 1 to 4 in firing order, respectively, the combustion is performed in the order of the first cylinder 2A, the third cylinder 2C, the fourth cylinder 2D, and then the second cylinder 2B. Therefore, for example, when the first cylinder 2A is on expansion stroke, the third cylinder 2C, the fourth cylinder 2D, and the second cylinder 2B are on compression stroke, intake stroke, and exhaust stroke, respectively.

The cylinder head 4 is provided with intake and exhaust ports 9 and 10 for opening in the combustion chambers 6 of the cylinders 2A to 2D, and intake and exhaust valves 11 and 12 for opening and closing the ports 9 and 10, respectively. Note that, the intake and exhaust valves 11 and 12 are opened and closed by valve operating mechanisms 13 and 14 that respectively include a pair of camshafts arranged in the cylinder head 4, in conjunction with the rotation of the crankshaft 7.

Further, the cylinder head 4 is provided with one fuel injection valve 15 for each cylinder, and each fuel injection valve 15 is connected therewith via a common rail 20 serving as an accumulating chamber, and a branched tube 21. The common rail 20 is supplied with fuel (e.g., diesel fuel) from a fuel supply pump 23 via a fuel supply tube 22 at high pressure, and the highly pressurized fuel inside the common rail 20 is supplied to each fuel injection valve 15 via the branched tube 21.

Each fuel injection valve 15 comprises an electromagnetic needle valve provided in its tip with an injection nozzle formed with a plurality of holes, a fuel passage leading to the injection nozzle, and a needle valve body, electromagnetically operated for opening and closing the fuel passage, provided inside the fuel injection valve 15 (both not illustrated). Further, by driving the valve body in an opening direction by using the electromagnetic force obtained through a power distribution, the fuel supplied from the common rail 20 is directly injected from each hole of the injection nozzle into the combustion chamber 6. The fuel injection valve 15 corresponds to the fuel injector in the claims, which injects the fuel into any of the cylinders 2A to 2D.

The cylinder block 3 and the cylinder head 4 are formed therein with a water jacket (arranged outside the range of FIG. 1) where a coolant flows, and a water temperature sensor SW1 for detecting a temperature of the coolant inside the water jacket is formed in the cylinder block 3.

Further, a crank angle sensor SW2 for detecting a rotational angle and a rotational speed of the crankshaft 7 is provided in the cylinder block 3. The crank angle sensor SW2 outputs a pulse signal corresponding to the rotation of a crank plate 25 that rotates integrally with the crankshaft 7.

Specifically, multiple teeth aligned via a fixed pitch are convexly arranged in an outer circumferential part of the crank plate 25, and a tooth-lacking part 25a (i.e., the part with no tooth) for identifying a reference position is formed in a predetermined area of the outer circumferential part. Further, the crank plate 25 having the tooth-lacking part 25a at the reference position rotates and the pulse signal based thereon is outputted from the crank angle sensor SW2, and thus, the rotational angle (i.e., crank angle) and the rotational speed (i.e., engine speed) of the crankshaft 7 are detected.

On the other hand, the cylinder head 4 is provided with a cam angle sensor SW3 for detecting an angle of the camshaft for valve operation (not illustrated). The cam angle sensor SW3 outputs a pulse signal for cylinder determination corresponding to the transit of teeth of a signal plate for rotating integrally with the camshaft.

In other words, the pulse signal outputted from the crank angle sensor SW2 includes a no-signal portion generated every 360° CA corresponding to the tooth-lacking part 25a. Using only with the information obtained from the no-signal portion, for example, while the piston 5 rises, the corresponding cylinder and the stroke between the compression stroke and exhaust stroke cannot be determined. Therefore, the pulse signal is outputted from the cam angle sensor SW3 based on the rotation of the camshaft that rotates once every 720° CA, and based on a timing of the signal output and a timing of the no-signal portion output from the crank angle sensor SW2 (i.e., transit timing of the tooth-lacking part 25a), the cylinder determination is performed.

The intake and exhaust ports 9 and 10 are connected with intake and exhaust passages 28 and 29, respectively. Thus, intake air (i.e., fresh air) from outside is supplied to the combustion chamber 6 via the intake passage 28 and exhaust gas (i.e., combusted gas) generated in the combustion chamber 6 is discharged outside via the exhaust passage 29.

In the intake passage 28, an area of a predetermined length upstream from the engine body 1 is defined as branched passage 28a respectively branched for each of the cylinders 2A to 2D, and upstream ends of the branched passage 28a are connected with a surge tank 28b. A single common passage 28c is formed upstream of the surge tank 28b.

The common passage 28c is provided with an intake throttle valve 30 for adjusting an air amount (i.e., intake air amount) to flow into the cylinders 2A to 2D. The intake throttle valve 30 is basically kept fully opened or largely opened while the engine is in operation, and is closed to isolate the intake passage 28 as needed to stop the engine, for example.

An intake pressure sensor SW4 for detecting an intake pressure is provided to the surge tank 28b and an airflow sensor SW5 for detecting an intake airflow rate is provided to the common passage 28c between the surge tank 28b and the intake throttle valve 30.

The crankshaft 7 is coupled to an alternator 32 via, for example, a timing belt. The alternator 32 is built therein with a regulator circuit for controlling a current of a feed coil (arranged outside the range of FIG. 1) to adjust a power generation amount and obtaining a drive force from the crankshaft 7 to generate a power based on a target value of the power generation amount (i.e., target power generating current) determined based on, for example, an electrical load of the vehicle and a remaining level of a battery.

The cylinder block 3 is provided with a starter motor 34 for starting the engine. The starter motor 34 includes a motor body 34a and a pinion gear 34b rotatably driven by the motor body 34a. The pinion gear 34b is detachably matched with a ring gear 35 coupled to an end of the crankshaft 7. When starting the engine by the starter motor 34, the pinion gear 34b moves to a predetermined matching position to match with the ring gear 35 and a rotational force of the pinion gear 34b is transmitted to the ring gear 35, and thereby, the crankshaft 7 is rotationally driven.

(2) Control System

Each component of the engine configured as above is controlled overall by an electronic control unit (ECU) 50. The ECU 50 is a microprocessor comprising, for example, a CPC, a ROM, and a RAM that are well known, and corresponds to a controller in the claims.

The ECU 50 is inputted with various information from the various sensors. In other words, the ECU 50 is connected with the water temperature sensor SW1, the crank angle sensor SW2, the cam angle sensor SW3, the intake pressure sensor SW4, and the airflow sensor SW5 that are provided as parts of the engine, respectively. The ECU 50 acquires the various information including the temperature of the coolant of the engine, the crank angle, the engine speed, the cylinder determination result, the intake pressure, and the intake airflow rate, based on the input signals from the sensors SW1 to SW5.

Further, the ECU 50 is also inputted with information from various sensors (SW6 to SW9) provided to the vehicle. In other words, the vehicle is provided with an accelerator position sensor SW6 for detecting a position of an acceleration pedal 36 pressed by a driver, a brake sensor SW7 for detecting whether a brake pedal 37 is ON/OFF (i.e., the application of the brake), a vehicle speed sensor SW8 for detecting a traveling speed of the vehicle (i.e., vehicle speed), and a battery sensor SW9 for detecting the remaining level of the battery (not illustrated). The ECU 50 acquires the information including the accelerator position, the application of the brake, the vehicle speed, and the remaining level of the battery, based on the input signals from the sensors SW6 to SW9.

The ECU 50 controls the components of the engine respectively while performing various calculations based on the inputted signals from the sensors SW1 to SW9. Specifically, the ECU 50 is electrically connected with the fuel injection valve 15, the intake throttle valve 30, the alternator 32, and the starter motor 34, and outputs drive control signals to the components, respectively, based on the results of the calculations.

Next, the function of the ECU 50 is described in further detail. In normal operation of the engine, the ECU 50 has basic functions, such as: injecting a required amount of fuel based on operating conditions from the fuel injection valve 15; and generating a required amount of power based on, for example, the electrical load on the vehicle and the remaining level of the battery by the alternator 32. The ECU 50 also has functions to automatically stop the engine and restart the engine under predetermined conditions, respectively. Therefore, the ECU 50 has an automatic stop controller 51 and a restart controller 52 serving as functional elements regarding the automatic stop and restart controls of the engine.

During the operation of the engine, the automatic stop controller 51 determines whether the predetermined automatic stop conditions of the engine are satisfied, and when they are satisfied, the automatic stop controller 51 automatically stops the engine.

For example, when a plurality of conditions, such as the vehicle is stopped, are all met and it is confirmed that it would not be disadvantageous to stop the engine, it is determined that the automatic stop conditions are satisfied. Thus, the engine is stopped by, for example, stopping the fuel injection from the fuel injection valve 15 (i.e., a fuel cut).

After the engine is automatically stopped, the restart controller 52 determines whether the restart condition is satisfied, and when it is satisfied, the restart controller 52 restarts the engine.

For example, when the engine is required to start, such as when the driver presses the acceleration pedal 36, the restart condition is determined to be satisfied. Thus, by restarting the fuel injection from the fuel injection valve 15 while applying the rotational force on the crankshaft 7 by driving the starter motor 34, the restart controller 52 restarts the engine.

(3) Automatic Stop Control

Next, an example of specific control operation of the automatic stop controller 51 of the ECU 50 controlling the engine automatic stop is described with reference to the flowchart in FIG. 2.

Figure 2:
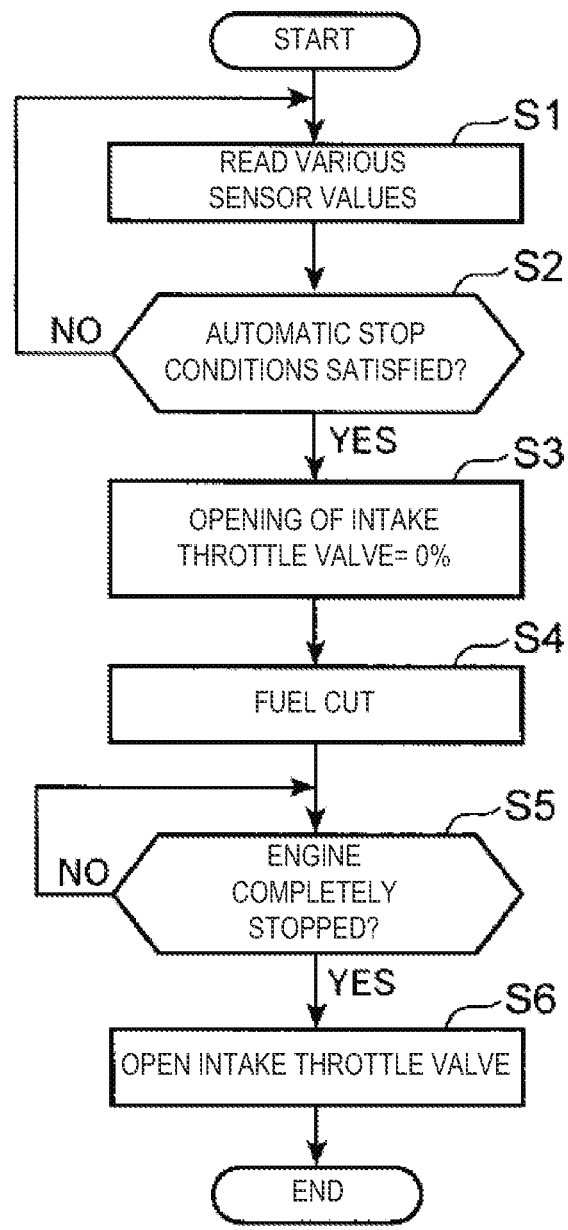
FIG. 2 is a flowchart showing an example of a specific operation of an automatic stop control of the engine.

When the processing shown in the flowchart in FIG. 2 starts, the automatic stop controller 51 reads various sensor values (Step S1). Specifically, the automatic stop controller 51 reads the detection signals from the water temperature sensor SW1, the crank angle sensor SW2, the cam angle sensor SW3, the intake pressure sensor SW4, the airflow sensor SW5, the accelerator position sensor SW6, the brake sensor SW7, the vehicle speed sensor SW8, and the battery sensor SW9, and based on these signals, it acquires various information, such as the coolant temperature of the engine, the crank angle, the engine speed, the cylinder determination result, the intake air pressure, the intake airflow rate, the accelerator position, the brake position, the vehicle speed, and the remaining level of the battery.

Next, based on the information acquired by Step S1, the automatic stop controller 51 determines whether the automatic stop conditions of the engine are satisfied (Step S2). For example, the automatic stop conditions of the engine are determined to be satisfied when a plurality of conditions, such as the vehicle is stopped (i.e., vehicle speed=0 km/h), the opening of the acceleration pedal 36 is zero (i.e., accelerator OFF), the brake pedal 37 is in operation (i.e., brake ON), the coolant temperature is above the predetermined value (i.e., warmed-up state), and the remaining level of the battery is above a predetermined value are all satisfied. Note that, regarding the vehicle speed, the vehicle is not necessarily completely stopped (i.e., vehicle speed=0 km/h), and it may be below a low vehicle speed (e.g., below 3 km/h).

When it is confirmed that the automatic stop conditions are satisfied (Step S2: YES), the automatic stop controller 51 sets the opening of the intake throttle valve 30 to be fully closed (i.e., set to 0%) (Step S3). In other words, when the automatic stop conditions are satisfied, the opening of the intake throttle valve 30 is reduced from a predetermined opening, which is set during the idle drive, to fully closed (i.e., set to 0%).

Subsequently, the automatic stop controller 51 keeps the fuel injection valve 15 closed to stop the fuel supply from the fuel injection valve 15 (i.e., fuel cut) (Step S4).

Next, the automatic stop controller 51 determines whether the engine speed is 0 rpm to determine whether the engine is completely stopped (Step S5). Further, if the engine is completely stopped, the automatic stop controller 51 sets the opening of the intake throttle valve 30 to a predetermined opening (e.g., 80%) which is set in the normal operation (Step S6). Then the automatic stop control finishes.

(4) Restart Control and Operation and Effect of This Embodiment

Next, an example of specific control operation of the restart controller 52 of the ECU 50 controlling the engine restart is described with reference to the flowchart in FIG. 3.

Figure 3:
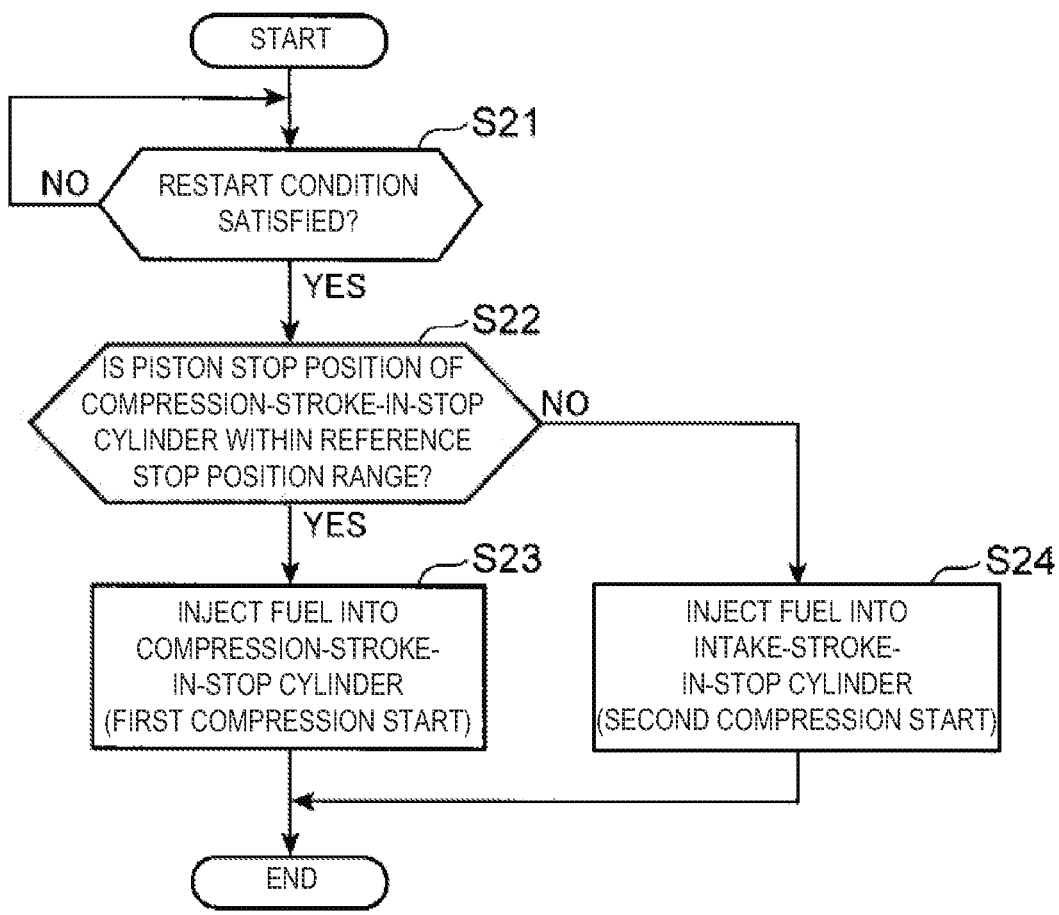
FIG. 3 is a flowchart showing an example of a specific operation of a restart control of the engine.

When the processing shown in the flowchart in FIG. 3 starts, the restart controller 52 determines whether the restart condition of the engine is satisfied based on the various sensor values (Step S21). For example, the restart condition of the engine is determined to be satisfied when at least one of the following conditions is satisfied: the acceleration pedal 36 is pressed to start the vehicle (i.e., accelerator ON); the remaining level of the battery is decreased; the coolant temperature of the engine is below a predetermined value (e.g., cold start); and the continuous stopped time period of the engine (i.e., the lapsed time period after the automatic stop) exceeds a predetermined time length.

When it is confirmed that the restart condition is satisfied (Step S21: YES), the restart controller 52 determines whether the piston stop position of the compression-stroke-in-stop cylinder (i.e., the cylinder that is on the compression stroke while the engine is stopped) is within the reference stop position range R (e.g., between 83° CA and 180° CA before a compression top dead center, TDC) based on the map shown in FIG. 4 (Step S22).

Here, the map is used when restarting the engine, to determine whether to reactivate the engine by the first compression start or the second compression start. The first compression start means restarting the engine by injecting the fuel into the compression-stroke-in-stop cylinder when the engine overall reaches the TDC for the first time in the restart (i.e., first TDC). The second compression start means restarting the engine by injecting the fuel into the compression-stroke-in-stop cylinder when the engine overall reaches the TDC for the second time in the restart (i.e., the second TDC).

Figure 4:
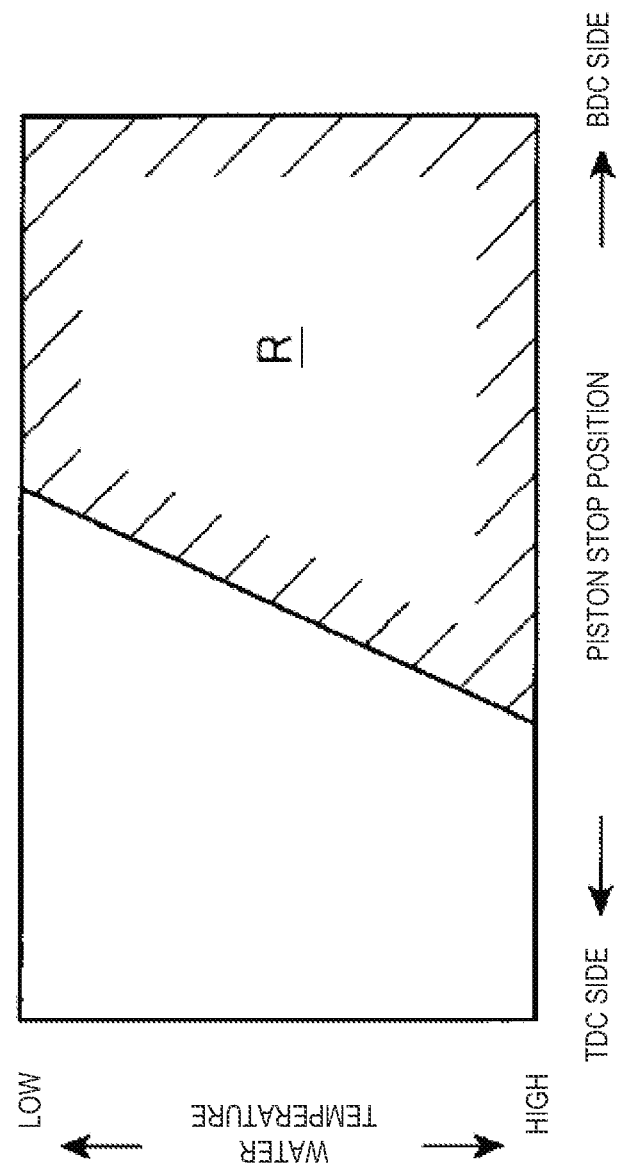
FIG. 4 is a map used to determine the restart control between a first compression start and a second compression start.

As shown in FIG. 4, in the determination map, the reference stop position range R is set by having the piston stop position of the compression-stroke-in-stop cylinder and the engine coolant temperature as parameters. Here, the engine coolant temperature in the vertical axis indicates the temperature when the engine restart control starts. In this embodiment, the phrase "when the engine restart control starts" means when it is confirmed that the restart condition is satisfied at Step S21.

As shown in FIG. 4, the reference stop position range R is set relatively on a dead bottom center (BDC) side, and expands toward the TDC side as the engine coolant temperature increases. In other words, if the engine coolant temperature when the restart control starts is relatively high, the piston stop position of the compression-stroke-in-stop cylinder highly likely enters the reference stop position range R compared to when the engine coolant temperature is relatively low.

When the piston stop position of the compression-stroke-in-stop cylinder is confirmed to be within the reference stop position range R (Step S22: YES), the restart controller 52 restarts the engine by injecting the fuel into the compression-stroke-in-stop cylinder first (i.e., the first compression start) (Step S23). In other words, by injecting the fuel into the compression-stroke-in-stop cylinder for self-ignition while driving the starter motor 34 to apply the rotational force to the crankshaft 7, the combustion restarts when the engine overall reaches the first TDC, and the engine is restarted. Then, the restart control finishes.

On the other hand, when the piston stop position of the compression-stroke-in-stop cylinder is confirmed to be outside the reference stop position R (Step S22: NO), the restart controller 52 restarts the engine by injecting the fuel into the intake-stroke-in-stop cylinder (i.e., the cylinder that is on the intake stroke while the engine is stopped) first (i.e., the second compression start) (Step S24). In other words, by injecting, while driving the starter motor 34 to apply the rotational force to the crankshaft 7, the fuel into the compression-stroke-in-stop cylinder for self-ignition when the engine overall passes the first TDC and the intake-stroke-in-stop cylinder reaches the compression stroke, the combustion restarts when the engine overall reaches the second TDC, and the engine is restarted. Then, the restart control finishes.

In other words, the start control device of the diesel engine (i.e., the compression self-ignition engine) according to this embodiment includes the ECU 50 for automatically stopping the engine when the predetermined automatic stop conditions are satisfied, and then, if the stop position of the piston 5 of the compression-stroke-in-stop cylinder is within the reference stop position range R when the predetermined restart condition is satisfied, by injecting the fuel into the compression-stroke-in-stop cylinder while applying the rotational force to the engine by using the starter motor 34, the ECU 50 restarts the engine.

The following is a comparison of the first compression start and the second compression start. As shown in FIG. 4, the reference stop position range R is relatively predisposed toward the BDC side (e.g., between 83° CA and 180° CA before the compression TDC). If the piston 5 of the compression-stroke-in-stop cylinder is stopped at the position on the BDC side, when restarting the engine, by injecting the fuel into the compression-stroke-in-stop cylinder first (i.e., first in the entire engine), the engine can be restarted promptly and surely by the first compression start. In other words, if the piston stop position of the compression-stroke-in-stop cylinder is within the reference stop position range R, because a comparatively large amount of air exists in the compression-stroke-in-stop cylinder, due to the rise of the piston 5 when restarting the engine, a compression stroke amount (i.e., a compression margin) by the piston 5 increases and the air inside the compression-stroke-in-stop cylinder is sufficiently compressed and increases its temperature. Therefore, when the fuel is injected into the compression-stroke-in-stop cylinder the first time in the restart, the fuel surely self-ignites inside the compression-stroke-in-stop cylinder and combusts.

On the other hand, if the piston 5 of the compression-stroke-in-stop cylinder is on the TDC side of the reference stop position range R, the compression stroke amount by the piston 5 becomes less and the temperature of the air inside the compression-stroke-in-stop cylinder does not increase sufficiently, and thus, a misfire may occur even if the fuel is injected into the compression-stroke-in-stop cylinder. Thus, in such a case, by injecting the fuel into the intake-stroke-in-stop cylinder and not the compression-stroke-in-stop cylinder, the air inside the intake-stroke-in-stop cylinder is sufficiently compressed and the fuel surely self-ignites (i.e. second compression start).

As above, when the piston 5 of the compression-stroke-in-stop cylinder is within the reference stop position range R, the engine can be restarted promptly by the first compression start. On the other hand, when the piston 5 is on the TDC side of the reference stop position range R, the fuel is required to be injected into the intake-stroke-in-stop cylinder in the second compression start, therefore, until the piston 5 of the intake-stroke-in-stop cylinder reaches near the compression TDC (i.e., until the engine overall reaches the second TDC), the self-ignition based on the fuel injection cannot be performed, and a restarting time period (in this embodiment, time period from the start of the starter motor 34 until the engine speed reaches 750 rpm) becomes long. Therefore, when restarting the engine, the engine is preferably restarted promptly by the first compression start.

In this embodiment, if the piston 5 of the compression-stroke-in-stop cylinder is stopped within the reference stop position range R, the first compression start, in which the fuel is injected into the compression-stroke-in-stop cylinder, is performed. To better ensure a prompt engine restart by increasing the potential for a first compression start, it is desirable to enlarge the reference stop position range R toward the TDC as much as possible. However, when the piston 5 is stopped relatively on the TDC side, because a compression stroke amount is less than when the piston is stopped relatively on the BDC side, a temperature inside the cylinder when being compressed to the TDC (i.e., the "TDC temperature") accordingly becomes insufficient and the fuel may not ignite. Therefore, there is a problem that the reference stop position range R is limited to a narrow range close to the BDC.

Thus, in this embodiment, when the first compression start is performed at Step S23, the restart controller 52 of the ECU 50 instructs the fuel injection valve 15 to perform the fuel injection including a pre-ignition; in other words, it controls the fuel injection valve 15 so that the pre-injection for a pre-combustion is performed before a main injection for a main combustion.

In this manner, in restarting the engine, when the first compression start is performed, because the pre-combustion is performed before the main combustion (i.e., the diffusion combustion), the timing of the pre-injection being preferably before the compression TDC and the timing of the main injection being preferably at or after the compression TDC, the temperature inside the compression-stroke-in-stop cylinder is increased by the pre-combustion, the TDC temperature is increased, and the ignitability of the fuel injected in the main injection after the pre-injection improves. Therefore, even when the stop position of the piston 5 of the compression-stroke-in-stop cylinder is relatively on the TDC side, in other words, even when an unfavorable condition for igniting the fuel injected into the compression-stroke-in-stop cylinder exists, by overcoming the disadvantage caused thereby by performing a pre-injection, the compression self-ignition engine can stably, promptly, and surely be restarted by the first compression start. In other words, the reference stop position range R can be enlarged toward the TDC side, the potential for the first compression start can be increased, and a prompt starting performance can be secured.

Additionally, in this embodiment, when the pre-injection is performed at Step S23, the restart controller 52 of the ECU 50 controls the fuel injection valve 15 to increase a total injection amount of the fuel for the pre-injection as the stop position of the piston 5 of the compression-stroke-in-stop cylinder is further on the TDC side.

In this manner, because the total injection amount of the fuel for the pre-injection increases as the stop position of the piston 5 of the compression-stroke-in-stop cylinder is further on the TDC side, a heat production during the pre-combustion increases, and the temperature inside the compression-stroke-in-stop cylinder further increases. As a result, even if the conditions for igniting the fuel injected into the compression-stroke-in-stop cylinder (i.e. the stop position of the piston 5 of the compression-stroke-in-stop cylinder is relatively on the TDC side) are relatively unfavorable, performing a pre-combustion increases the temperature inside the compression-stroke-in-stop cylinder, thereby increasing the TDC temperature, improving the ignitability of the fuel injected in the main injection after the pre-injection, and ensuring that the first compression start is reliably performed.

In addition, in this embodiment, when the pre-injection is performed at Step S23, the restart controller 52 of the ECU 50 controls the fuel injection valve 15 to increase the total injection amount of the fuel injected in the pre-injection as an engine coolant temperature decreases.

In this manner, because the total injection amount of the fuel injected in the pre-injection increases as an engine coolant temperature decreases, the heat produced during the pre-combustion increases, and the temperature inside the compression-stroke-in-stop cylinder further increases. As a result, even if the conditions for igniting the fuel injected into the compression-stroke-in-stop cylinder (the engine coolant temperature is relatively low) are relatively unfavorable, performing a pre-combustion increases the temperature inside the compression-stroke-in-stop cylinder, thereby increasing the TDC temperature, improving the ignitability of the fuel injected in the main injection after the pre-injection, and ensuring that the first compression start is reliably performed.

Figure 5:
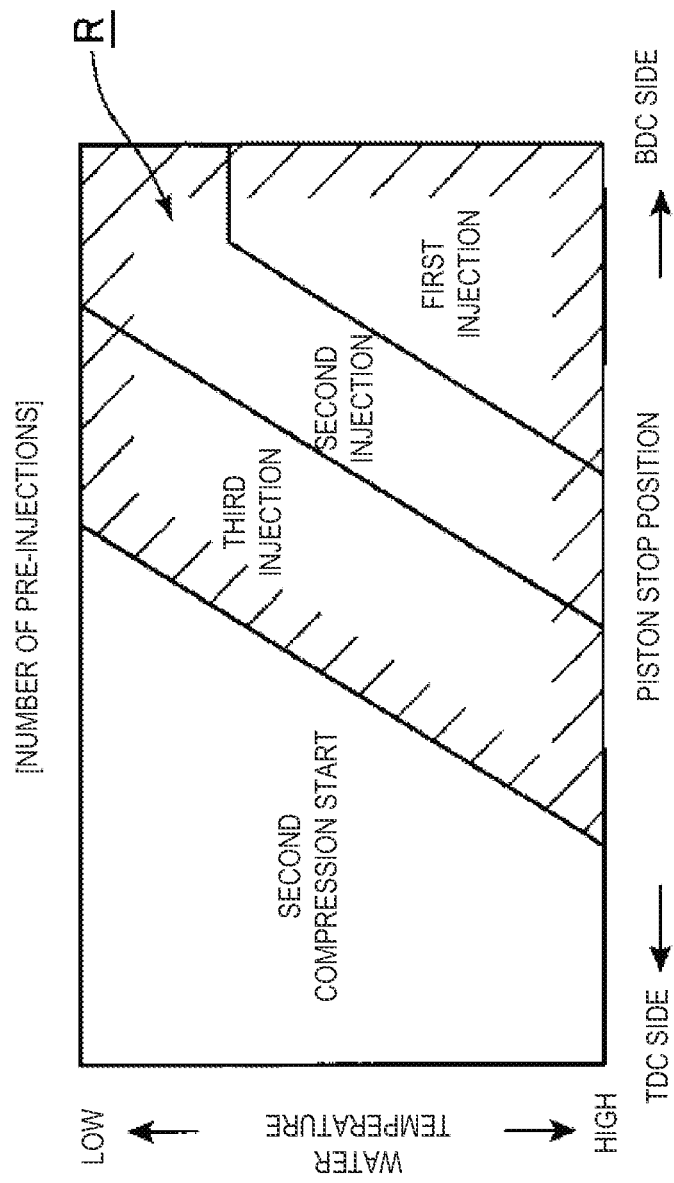
FIG. 5 is a map used to set the number of pre-injections when a first compression start is performed in the restart control.

A specific example of a map used in setting the number of the pre-injections when the first compression start is performed in the restart control shown in FIG. 5. Similar to the determination map in FIG. 4, the reference stop position range R is divided into a first injection range, a second injection range, and a third injection range in the pre-injection number setting map by having the piston stop position of the compression-stroke-in-stop cylinder and/or the engine coolant temperature as parameters. Further, when the first compression start is performed at Step S23 in FIG. 3, the restart controller 52 determines the number of the pre-injections based on the stop position of the piston 5 of the compression-stroke-in-stop cylinder and the engine coolant temperature when the restart condition is satisfied, with reference to the number setting map, FIG. 5. Subsequently, the pre-injections are performed for the determined number of times, and thereafter, the main injection for generating the torque to start the engine is performed.

As above, in this embodiment, the restart controller 52 of the ECU 50 controls the fuel injection valve 15 so that the fuel for the pre-injection is divided and pre-injected in a single or divided multiple-stage fashion. Further, the restart controller 52 controls the fuel injection valve 15 to increase the total injection amount of the fuel for the pre-injection by increasing the number of the pre-injections.

In this manner, by increasing the number of divided pre-injections while, for example, fixing the fuel injection amount per single pre-injection, the total injection amount of the fuel for the pre-injection can easily and surely be increased.

In FIG. 5, the number of the pre-injections is increased as the piston stop position of the compression-stroke-in-stop cylinder is further on the TDC side, and also as the engine coolant temperature is lower. Therefore, the fuel for the pre-injection is pre-injected a larger number of times as the conditions for igniting the fuel injected into the compression-stroke-in-stop cylinder become relatively more unfavorable, and as a result, the total injection amount of the fuel for the pre-injection further increases (e.g., by setting or adjusting the fuel injection amount per single pre-injection and increasing the number of pre-injections). As such, even if the conditions for igniting the fuel injected into the compression-stroke-in-stop cylinder become relatively more unfavorable, performing the pre-injection ensures that the ignitability of the fuel injected in the main injection is improved and the first compression start is reliably performed.

The determination map shown in FIG. 4 and the number setting map shown in FIG. 5 are generally created as follows. Firstly, the temperature inside the compression-stroke-in-stop cylinder when the piston 5 of the cylinder compresses the air therein to the TDC from the piston stop position (i.e., the engine TDC temperature) is calculated based on Equation 1:

$$TCYLTDC = TCYLISS \times (VTEI/VTDC)^{(k-1)} \quad (1)$$

Here, "TCYLTDC" indicates the TDC temperature, "TCYLISS" indicates the cylinder internal temperature when starting the restart control (i.e., when the restart condition is satisfied at Step S21 in FIG. 3), "VTEI" indicates a cylinder internal volume at the piston stop position, "VTDC" indicates a cylinder internal volume at the TDC, and "k" indicates a specific heat ratio. Note that, the cylinder internal temperature when starting the restart control (TCYLISS) is obtained based on a cylinder internal temperature when starting the fuel cut (i.e., when the process at Step S4 in FIG. 2 is performed), the engine coolant temperature when starting the restart control, a cylinder internal temperature decreasing speed gain, and a fuel cut continuing time period. Further, the cylinder internal temperature when starting the fuel cut is estimated based on an operating state of the engine immediately before the fuel cut (i.e., an idle state).

A final TDC temperature (TTDC) is obtained through correcting the TDC temperature (TCYLTDC) calculated based on Equation 1 by the atmospheric pressure. Further, the reference stop position range R and the number of the pre-injections are determined according to the final TDC temperature (TTDC). For example, a final TDC temperature (TTDC) below 800° C. is considered to be outside the reference stop position range R, between 800° C. and 900° C. is considered to be within the third injection range, between 900° C. and 970° C. is considered to be within the second injection range, and above 970° C. is considered to be within the first injection range.

Figure 6:
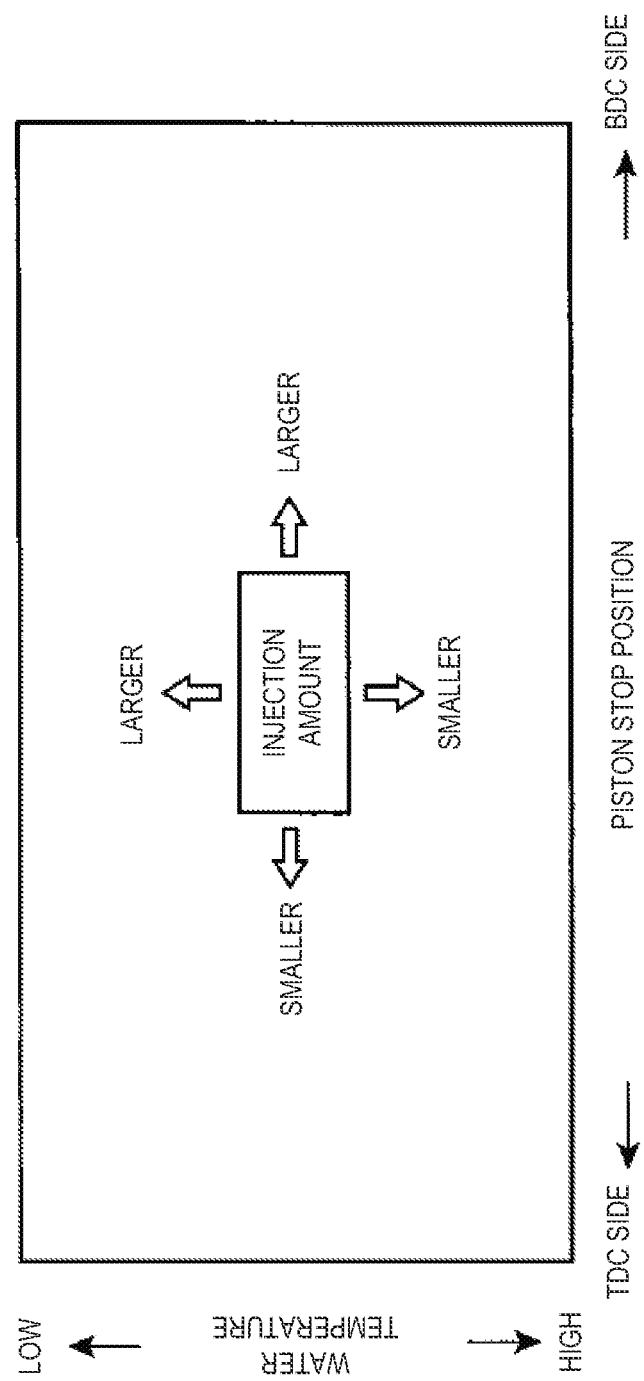
FIG. 6 is a map used to set a fuel injection amount injected into a cylinder in the restart control.

In this embodiment, as shown in FIG. 6, the fuel injection amount injected into the cylinder in the restart control is increased as the piston stop position is further on the BDC side and/or the engine coolant is lower. This is the result of setting the fuel injection amount corresponding to the air amount inside the cylinder determined by the piston stop position and/or corresponding to the engine temperature. Note that, the fuel injection amount setting map illustrated in FIG. 6 can be used in both the first and second compression starts. The set value of the fuel injection amount is not effective within the range relatively on the TDC side that is outside the reference stop position range R in the case of the first compression start. Further, in the case of the second compression start, the fuel injection amount is set only for 180° CA before the compression TDC or for the crank angle corresponding to the IVC timing of the intake valve 11 (e.g., 144° CA before the compression TDC).

In this embodiment, when the pre-injection is performed at Step S23, the restart controller 52 of the ECU 50 controls the fuel injection valve 15 to increase the injection amount of the fuel for the main injection as the stop position of the piston 5 of the compression-stroke-in-stop cylinder is further on the BDC side.

In this manner, because the injection amount of the fuel for the main injection increases as the stop position of piston 5 of the compression-stroke-in-stop cylinder is further on the BDC side, the fuel in the amount corresponding to a filling amount (i.e., air amount) in the first compression of the compression-stroke-in-stop cylinder is injected in the main injection. Therefore, the torque for starting the engine is generated sufficiently and the engine is started smoothly.

Here, the fuel injection amount set in the fuel injection amount setting map in FIG. 6 corresponds to the total fuel injection amount of the pre-injection and the main injection determined according to the stop position of the piston 5 of the compression-stroke-in-stop cylinder (i.e., corresponding to the filling amount in the first compression of the compression-stroke-in-stop cylinder). In such a manner, in the total fuel injection amount of the pre-injection and the main injection, the fuel injection amount for the pre-injection is increased and the fuel injection amount for the main injection is reduced as the stop position of the piston 5 of the compression-stroke-in-stop cylinder is further on the TDC side. As a result, an injection pattern prioritizing the ignitability is created. On the other hand, in the total fuel injection amount of the pre-injection and the main injection, the fuel injection amount for the main injection is increased and the fuel injection amount for the pre-injection is reduced as the stop position of the piston 5 of the compression-stroke-in-stop cylinder is further on the BDC side. As a result, an injection pattern prioritizing the torque is created.

Note that, when the second compression start is performed at Step S24 in FIG. 3, the pre-injection may or may not be performed. However, in this embodiment, even when the second compression start is performed, similar to when performing the first compression start, the restart controller 52 of the ECU 50 instructs the fuel injection valve 15 to perform the fuel injection including the pre-injection; in other words, it controls the fuel injection valve 15 so that the pre-injection for the pre-combustion is performed before the main injection for the main combustion. Further, various control modes when performing the pre-injection at Step S24 (i.e., during the second compression start) are similar within the applicable range, to the various control modes when performing the pre-injection at Step S23 (i.e. during the first compression start).

(5) Other Embodiments

The unfavorable conditions for igniting the fuel injected into compression-stroke-in-stop cylinder include, in addition to the stop position of the piston 5 of the compression-stroke-in-stop cylinder being on the TDC side and the engine coolant temperature being relatively low, the cylinder internal temperature when starting the restart control (i.e., when the restart condition is satisfied) (TCYLISS) being relatively low, the external air temperature (i.e., the temperature of the fresh air introduced into the cylinder or the intake air temperature) being relatively low, and the atmospheric pressure (i.e., the pressure of the fresh air introduced into the cylinder or the intake air pressure) being relatively low.

Therefore, the ECU 50 can also control the fuel injection valve 15 to increase the total injection amount of the fuel for the pre-injection if, for example, the cylinder internal temperature when starting the restart control (i.e., when the restart condition is satisfied) becomes lower, the intake temperature during the engine automatic control becomes lower, or the intake pressure during the engine automatic control becomes lower.

Also in this manner, even if the conditions for igniting the fuel injected into the compression-stroke-in-stop cylinder become relatively more unfavorable, performing the pre-combustion increases the temperature inside the compression-stroke-in-stop cylinder, thereby increasing the TDC temperature, improving the ignitability of the fuel injected in the main injection, and ensuring that the first compression start is reliably performed.

Further, in the above embodiment, when the automatic stop conditions are satisfied (Step S2: YES), the opening of the intake throttle valve 30 is fully closed (i.e., set to 0%) (Step S3), and thereafter, when the intake pressure is decreased to some extent, the fuel cut is performed to stop the fuel injection from the fuel injection valve 15 (Step S4); however, the fuel cut may be performed simultaneous to when the intake throttle valve 30 is fully closed.

Further, in the above embodiment, the pre-injection is performed every time the first compression start is performed at Step S23; however, depending on the conditions (e.g., the piston stop position is extremely close to the BDC or the engine coolant temperature is extremely high), the first compression start may be performed without any pre-injection.

Further, the above embodiment describes the example where the diesel engine (i.e., the engine that combusts diesel fuel by self-ignition) is used, and the automatic stop and restart controls according to the above embodiment are applied to the diesel engine; however, the engine is not limited to the diesel engine, as long as it is a compression self-ignition engine. For example, recently, a homogeneous-charge compression ignition (HCCI) engine where the fuel containing gasoline self-ignites by being compressed at a high compression ratio has been studied and developed. The automatic stop and restart controls according to the above embodiment can suitably be applied also to such a compression self-ignition gasoline engine.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

DESCRIPTION OF REFERENCE CHARACTERS 2A to 2D Cylinder
5 Piston
15 Fuel Injection Valve (Fuel Injector)
34 Starter Motor
50 ECU (Controller)
R Reference Stop Position Range

The invention claimed is:

1. A start control device, comprising:
a compression self-ignition engine;
fuel injectors for injecting fuel into respective cylinders of the engine;
a piston stop position detector for detecting stop positions of pistons in the cylinders;
a starter motor for applying a rotational force to the engine, the engine combusting through a self-ignition, the fuel injected into the cylinders by the fuel injectors; and
a controller for automatically stopping the engine when a predetermined automatic stop condition is satisfied, and thereafter, when a predetermined restart condition is satisfied and the stop position of the piston of a compression-stroke-in-stop cylinder that is on a compression stroke while the engine is stopped is within a reference stop position range set relatively on a bottom dead center side, restarting the engine by injecting the fuel into the compression-stroke-in-stop cylinder while applying the rotational force to the engine by using the starter motor,
wherein in restarting the engine, when the fuel is injected in the compression-stroke-in-stop cylinder, the controller controls the fuel injector to perform a pre-injection for a pre-combustion before a main injection for a main combustion and increase a total injection amount of the fuel for the pre-injection as the stop position of the piston of the compression-stroke-in-stop cylinder is further on a top dead center side.

2. The device of claim 1, wherein the controller controls the fuel injector to pre-inject the fuel for the pre-injection in a single or divided multiple-stage fashion, and increase the total injection amount of the fuel for the pre-injection by increasing the number of the pre-injections.

3. The device of claim 2, wherein the controller controls the fuel injector to increase the total injection amount of the fuel for the pre-injection as a temperature of a coolant of the engine decreases.

4. The device of claim 2, wherein the controller controls the fuel injector to increase a total injection amount of the fuel for the main injection as the stop position of the piston of the compression-stroke-in-stop cylinder is further on the bottom dead center side.

5. The device of claim 1, wherein the controller controls the fuel injector to increase the total injection amount of the fuel for the pre-injection as a temperature of a coolant of the engine decreases.

6. The device of claim 5, wherein the controller controls the fuel injector to increase a total injection amount of the fuel for the main injection as the stop position of the piston of the compression-stroke-in-stop cylinder is further on the bottom dead center side.

7. The device of claim 1, wherein the controller controls the fuel injector to increase a total injection amount of the fuel for the main injection as the stop position of the piston of the compression-stroke-in-stop cylinder is further on the bottom dead center side.

8. A method of controlling a start of a compression self-ignition engine, comprising:
injecting fuel into cylinders of the engine by fuel injectors, respectively;
detecting stop positions of pistons in the cylinders;
applying a rotational force to the engine by a starter motor;
combusting the engine through a self-ignition, the fuel injected into the cylinders by the fuel injectors; and
automatically stopping the engine when a predetermined automatic stop condition is satisfied, and thereafter, when a predetermined restart condition is satisfied and the stop position of the piston of a compression-stroke-in-stop cylinder that is on a compression stroke while the engine is stopped is within a reference stop position range set relatively on a bottom dead center side, restarting the engine by injecting the fuel into the compression-stroke-in-stop cylinder while applying the rotational force to the engine by using the starter motor,
wherein in restarting the engine, when the fuel is injected in the compression-stroke-in-stop cylinder, the fuel injector is controlled to perform a pre-injection for a pre-combustion before a main injection for a main combustion and increase a total injection amount of the fuel for the pre-injection as the stop position of the piston of the compression-stroke-in-stop cylinder is further on a top dead center side.

* * * * *